(12) United States Patent
Fuglsang

(10) Patent No.: US 9,017,034 B2
(45) Date of Patent: Apr. 28, 2015

(54) UPWIND WIND TURBINE WITH BLADES SUPPORTED ON THE LEEWARD SIDE

(75) Inventor: Lars Fuglsang, Odense (DK)

(73) Assignee: LM Glasfiber A/S, Kolding (DE)

( * ) Notice: Subject to any disclaimer, the term of this patent is extended or adjusted under 35 U.S.C. 154(b) by 1180 days.

(21) Appl. No.: 12/988,691

(22) PCT Filed: Apr. 21, 2009

(86) PCT No.: PCT/EP2009/054729
§ 371 (c)(1),
(2), (4) Date: Oct. 20, 2010

(87) PCT Pub. No.: WO2009/130212
PCT Pub. Date: Oct. 29, 2009

(65) Prior Publication Data
US 2011/0031763 A1 Feb. 10, 2011

(30) Foreign Application Priority Data
Apr. 21, 2008 (EP) ..................................... 08388016

(51) Int. Cl.
*F03D 1/06* (2006.01)

(52) U.S. Cl.
CPC ........... *F03D 1/0658* (2013.01); *F05B 2260/30* (2013.01); *Y02E 10/721* (2013.01); *Y10S 416/06* (2013.01)

(58) Field of Classification Search
USPC ................. 416/9–17, 194, 195, 196 R, 196 A, 416/244 R, 244 A, 245 R, DIG. 6, 132 B; 415/4.3, 4.5, 908
See application file for complete search history.

(56) References Cited

U.S. PATENT DOCUMENTS

| 300,161 | A | * | 6/1884 | Taylor | 416/13 |
| 432,435 | A | * | 7/1890 | Peck | 416/15 |
| 493,060 | A | * | 3/1893 | Bowman | 416/13 |
| 2,516,576 | A | | 7/1950 | Jacobs | |
| 4,183,715 | A | | 1/1980 | Ducker | |

(Continued)

FOREIGN PATENT DOCUMENTS

| GB | 1 592 114 | 7/1981 |
| WO | 86/02701 A1 | 5/1986 |

OTHER PUBLICATIONS

International Search Report for International Application No. PCT/EP2009/054729, with a mailing date of Aug. 27, 2009, four (4) pages.

*Primary Examiner* — Christopher Verdier
(74) *Attorney, Agent, or Firm* — Nath, Goldberg & Meyer; Jerald L. Meyer; Sanjana Mangalagiri

(57) ABSTRACT

An upwind wind turbine comprising blades extending radially from a rigid hub on a main shaft having a horizontal axis is described. The blades and hub constitute a rotor with a rotor plane. The main shaft is pivotally mounted in a nacelle on top of a tower which pivots around the vertical axis of the tower. The rotor plane adjusts in relation to wind direction, so during normal use the rotor is positioned on the upwind side of the tower. Each blade has at least a first leeward supporting mechanism having first and second ends. The first end connects to the blade at a first leeward mounting point positioned in a radial distance from the horizontal axis. The second end connects to a second leeward mounting point at a rotatable part and is positioned in an axial distance from the rotor plane on the leeward side of the rotor.

14 Claims, 7 Drawing Sheets

(56) References Cited

U.S. PATENT DOCUMENTS

| | | |
|---|---|---|
| 4,316,699 A | 2/1982 | Schott et al. |
| 4,403,916 A | 9/1983 | Skelskey |
| 5,354,175 A | 10/1994 | Coleman et al. |
| 2004/0253093 A1* | 12/2004 | Shibata et al. ................ 415/4.1 |
| 2006/0182634 A1* | 8/2006 | Kirsch et al. .............. 416/244 A |

* cited by examiner

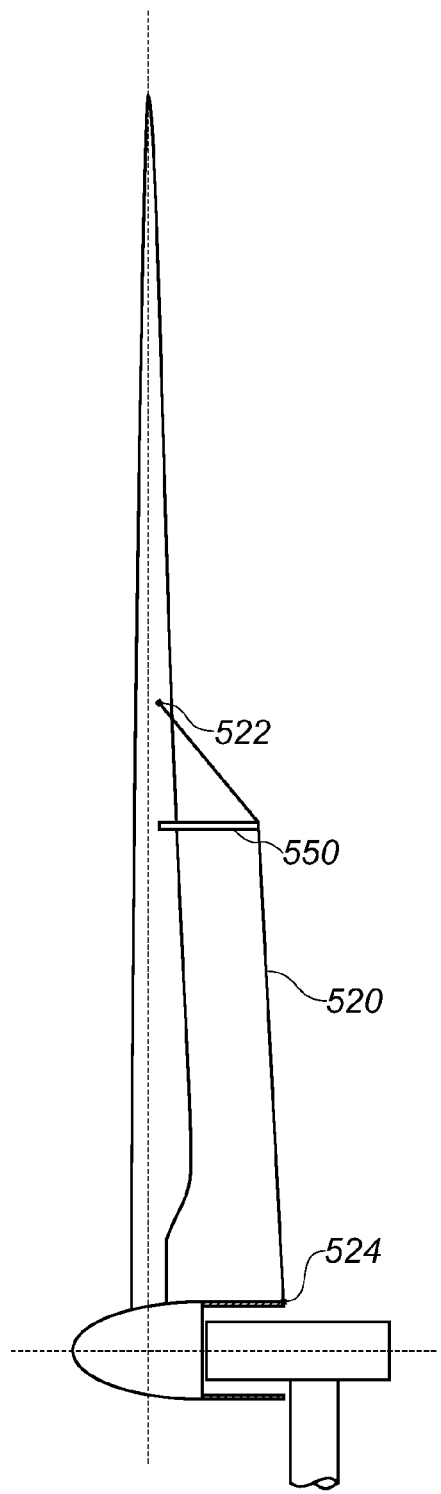 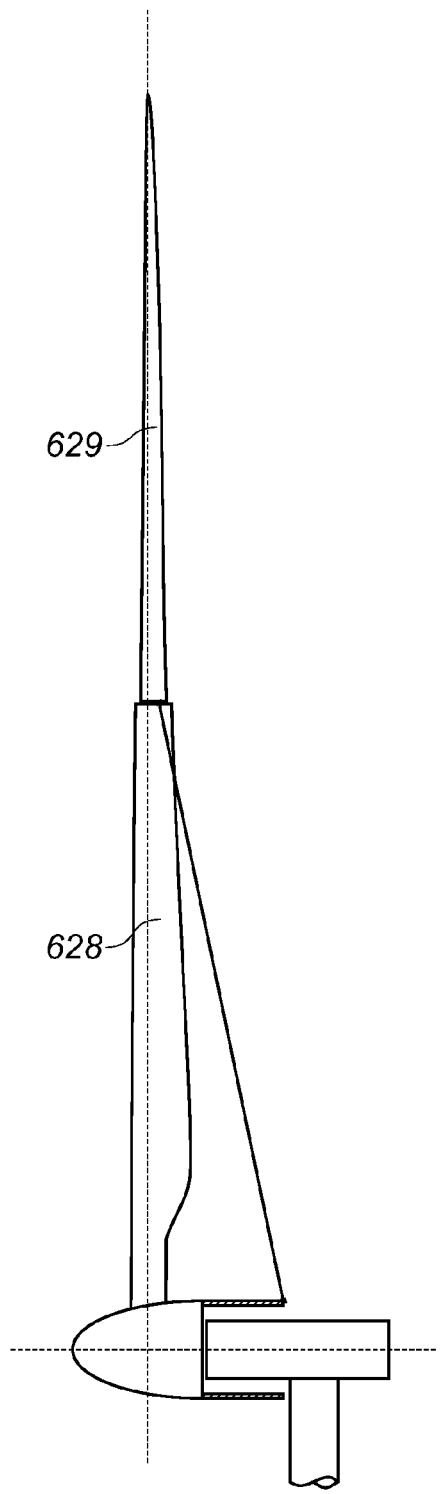
Fig. 5  Fig. 6

UPWIND WIND TURBINE WITH BLADES SUPPORTED ON THE LEEWARD SIDE

CROSS-REFERENCE TO PRIOR APPLICATIONS

This is a National Phase Application filed under 35 U.S.C. 371 as a national stage of PCT/EP2009/054729, filed Apr. 21, 2009, an application claiming foreign priority benefits under 35 U.S.C. 119 of European Application No. 08388016.1, filed Apr. 21, 2008, the content of each of which is hereby incorporated by reference in its entirety.

TECHNICAL FIELD

The present invention relates to a wind turbine comprising a number of blades extending substantially radially from a rigid hub on a main shaft having a substantially horizontal axis, the blades together with the hub constituting a rotor with a rotor plane, and which can be put into rotation by wind, wherein the main shaft is pivotally mounted in a nacelle mounted on top of a tower, the nacelle being able to pivot around a vertical axis in relation to the tower, hereby being able to adjust the rotor plane of the blades in relation to a direction of the wind, and wherein the wind turbine is an upwind machine in that the rotor during normal use of the wind turbine is positioned on the upwind side of the tower, the rotor during normal use of the wind turbine having a windward side and a leeward side, and each blade having an innermost part comprising a root section of the blade and an outermost part comprising a tip section of the blade. Furthermore, the invention relates to a method of supporting blades of an upwind wind turbine.

BACKGROUND ART

It is well known to provide blades of an upwind wind turbine with supporting means on the windward side of the rotor plane extending from the blades to for instance an extension of the main shaft. Such a configuration is e.g. shown in U.S. Pat. No. 4,403,916 and WO 86/02701. The object of such configurations is to support the blades against the forces of wind by exerting a tensile force in the direction against the wind.

U.S. Pat. No. 4,403,916 discloses a wind turbine with a generally vertical support tower, and a generally horizontal drive shaft, which is connected to a vertical drive shaft. The blades of the wind turbine are reinforced by wire cables to strengthen the blades against gravitational pull and to hold the blades against wind forces. The wind turbine further comprises a tail section or a vane that continuously yaw the horizontal drive shaft to point into the wind.

U.S. Pat. No. 5,354,175 describes an upwind configured wind turbine comprising a teeter hub. The teeter hub comprises a yoke assembly on the rearward side of the blade and two damping teeter control mechanisms for preventing teetering of the hub.

GB-A-1 592 114 describes a downwind configured wind turbine, where wind turbine blades are supported by struts on a windward side of the wind turbine blade.

U.S. Pat. No. 4,316,699 also describes a downwind configured wind turbine, where wind turbine blades are supported by struts on a windward side of the wind turbine blade.

U.S. Pat. No. 4,183,715 describes a windmill having vanes supported by rigid struts, which are connected to pivotal joints.

BRIEF DESCRIPTION OF THE INVENTION

The problem of applying the solution described in U.S. Pat. No. 4,403,916 to modern, large wind turbines having an upwind configuration is that the blade reinforcement system described only supports the blades on the windward side. As such, the blade still needs to be dimensioned to withstand sudden gusts of wind in the opposite direction. Also, large wind turbines commonly comprise a yaw mechanism that controls the direction in which the rotor plane is oriented. During operation, generally the rotor plane is oriented normally to the wind direction, but, e.g., under maintenance the rotor plane may be oriented at other angles with respect to the wind direction. In such situations, a blade reinforcement system as known in the art is insufficient to counter the wind loads on the blades. Therefore, blades need to be dimensioned to account for wind loads under such circumstance.

It is an object of the invention to obtain a new support arrangement for the blades of upwind wind turbines, which overcomes or ameliorates at least one of the disadvantages of the prior art or which provides a useful alternative.

According to the invention, the object is obtained by ensuring that each blade is supported on the leeward side by at least a first leeward supporting means having a first end and a second end, the first end being connected to the blade at a first leeward mounting point positioned in a radial distance from the horizontal axis, and the second end being connected to a second leeward mounting point at a rotatable part of the wind turbine, the second leeward mounting point being positioned in an axial distance from the rotor plane on the leeward side of the rotor, wherein the first leeward mounting point on the blade is positioned in a radial distance of 20-100% of the full length of the blade from the hub. The wind turbine uses an upwind configuration. That is, the rotor is arranged in front of a tower supporting a nacelle so that the front of the rotor, i.e. the windward side, faces the wind direction. The blades may be angled slightly in respect to the rotor plane, so that they form a cone, with a large top angle, rather than a plane, and they may furthermore exhibit a built-in pre-bend, so that they curve in the radial direction out of the rotor plane, i.e. in the flapwise direction. In such a situation the rotor plane is defined as the curved area that is swept by the blades during rotation. Supporting the blade on the leeward side supports the blade against forces in the up-wind direction, e.g. from a sudden drop in wind velocity, or even gusts of wind in a direction opposite to the prevailing wind. Therefore, the blade itself may be constructed lighter as it does not need to be dimensioned to withstand such forces. It is understood that the blade may be provided with multiple supporting means on the leeward side, distributed along the radial length of the blade.

According to a preferred embodiment of the invention, the rotor comprises three blades, which are mounted on a rigid hub. The blades may have an adjustable pitch, i.e. angle of attack to the wind.

In an alternative embodiment, the rotor comprises two blades.

In another embodiment of the invention, each blade is supported on the windward side by at least a first windward supporting means having a first end and a second end, the first end being connected to the blade at a first windward mounting point positioned in a radial distance from the hub, and the second end being connected to a second windward mounting point at a rotatable part of the wind turbine, the second forward mounting point being positioned in an axial distance from the rotor plane on the windward side of the rotor.

In an advantageous embodiment, the first windward mounting point and the first leeward mounting point are located in substantially the same radial distance from the hub, so that the forces imposed by the windward and leeward supporting means on the blade balance each other. In this configuration, the two supporting means carry part of the weight of the blade, which enables construction of longer blades.

In one embodiment, the second windward mounting point is located on an extension of the main shaft on the windward side of the rotor plane. In another embodiment, the blades are inter-connected by a set of connection means that runs from one blade to a subsequent blade, as seen in the direction of rotation. By using an arrangement with supporting means on both the windward and leeward side of the rotor plane, the hub may be constructed lighter, and not as stiff as in a conventional wind turbine, e.g. the hub could be constructed as merely a cylindrical tube that is dimensioned to withstand the radial forces exerted by the blades.

In an embodiment of the invention, the blades are fiber-reinforced polymer shell bodies. The shell bodies are preferably made of a polymer material reinforced with glass, carbon, or other reinforcement fibres. This enables the construction of large blades, with advantageous weight-stiffness and weight-strength ratios.

In an advantageous embodiment of the invention, the first leeward supporting means and/or the first windward supporting means are chosen from the group of stays, stiffeners, guys, wires, or struts. Of course also other types of supporting means could be chosen. The first leeward supporting means are optimised to exert a tensile force on the blade towards the leeward side of the rotor plane. Preferably, the first leeward supporting means are purposely chosen to allow the blade to flex under wind pressure, i.e. towards the leeward side. Particularly, they need not be rigid so as to exert a force towards the windward side of the rotor plane. Furthermore, the supporting means may be provided with an aerofoil-like profile. This may be, for example, a so-called drag reducing profile, where the profile has a symmetrical drop shape. In this way, the wind resistance of the supporting means is reduced, and noise emission may be lowered.

According to a preferred embodiment of the invention, the first leeward mounting point on the blade is positioned in a radial distance of 20-100% of the full length of the blade from the hub, or alternatively between 25-70%, or yet alternatively between 30-60%. The first leeward mounting point is chosen so that the supporting means helps to carry at least part of the weight of the blade. Furthermore, the point should be chosen in relation to the axial distance between the rotor plane and the second leeward mounting point, so that a sufficient support of the blade in the axial direction is achieved. If, for instance, the first leeward mounting point is chosen to be 20 m in the radial direction from the hub, and the second leeward mounting point is chosen to be 3 m in the axial direction from the rotor plane, the force (P) exerted on the supporting means is approximately 7 times the force (F) in the axial direction exerted on the blade by the support. This follows from the relation (F=P sin(a)), where (a) is the angle between the rotor plane and the supporting means.

In another embodiment according to the invention, the blade is provided with the first leeward mounting point in proximity to the leading edge of the blade, and an additional first leeward mounting point in proximity to the trailing edge of the blade, the two first leeward mounting points having substantially the same radial distance from the hub. By using a set of two leeward supporting means connected to both the leading and trailing edge of the blade, respectively, the load on the supporting means is substantially halved, and the loads from the mounting points are displaced over a larger area of the blade, which leads to a stronger connection. The blade may of course be provided with multiple sets of leeward supporting means distributed along the length of the blade. The first leeward mounting point and the additional first leeward mounting point may also be provided at different positions along the blade.

According to another advantageous embodiment, the blade is provided with at least a first spacing means that protrudes substantially normally to the rotor plane on the leeward side of the rotor, and where the spacing means intersects the first leeward supporting means. The use of a spacing means increases the angle (a) between the rotor plane and the first leeward supporting means, so that less tension in the supporting means is needed to achieve a given force exerted on the blade in the axial direction. Additionally, by use of multiple spacing means, the innermost part of blade may be supported against the wind load.

According to a further embodiment of the invention, the blade is provided with at least a first spacing means that protrudes substantially normally to the rotor plane on the leeward side of the rotor, and where the first spacing means intersects the first leeward supporting means. Further according to this embodiment, the second leeward mounting point is located on the blade in proximity to the blade root. If the blade is pitchable, the first spacing means may be rigidly attached to the blade, so as to rotate together with the blade when the pitch is adjusted. In this case, the first spacing means is substantially normal to the rotor plane under normal operation. Alternatively, the first spacing means may be mounted on the blade in such a direction that it is substantially normal to the rotor plane, when the blades are pitched to a parked position, e.g. when the turbine is halted. The spacing means may be provided as a guy or strut or any other suitable rigid support. Naturally, the blade may be equipped with multiple spacing means to support multiple supporting means, e.g. with one spacing means that is substantially normal to the rotor plane during normal operation, and another spacing means that is substantially normal to the rotor plane when the turbine is halted.

In one embodiment, the first spacing means is made to extend forward in the windward direction in front of the rotor plane. In this case, a first windward supporting means may be made to intersect the windward extension of the spacing means. Further according to this embodiment, the second windward mounting point may be located on the blade in proximity to the blade root.

According to a broader aspect of the invention, also an embodiment having only the windward side support is contemplated, i.e. an embodiment without any leeward side support and with a spacing means extending on the windward side and with a windward supporting means connected between the first windward mounting point on the blade in a radial distance from the horizontal axis and the second windward mounting point located on the blade in proximity to the blade root, intersecting the spacing means between the first and second windward mounting points.

In one embodiment, the second leeward mounting point is located on an extension sleeve that is connectively mounted to the hub on the leeward side of the rotor, so that the sleeve surrounds the main shaft in a radial distance. According to a preferred embodiment, the extension sleeve is cylindrical and extends more than 3 meters in the axial direction, measured from the rotor plane. One end of the sleeve may be connected to the hub while the other end is open so as to accommodate any part of the nacelle that surrounds the main shaft and extends closer to the rotor plane than the end point of the sleeve. The extension sleeve may also have a non-cylindrical shape, e.g. an extruded triangle, or even a wire frame structure.

According to another embodiment of the invention, each blade has a total length of at least 40 meters. The invention is particularly useful for such long blades, due to the large loads involved.

In an alternative embodiment, the innermost and outermost parts of the blade are constructed as two individual parts, where one or both parts may be pitched around a longitudinal axis of the blade oriented substantially in the radial direction. In a preferred embodiment, one or both of the innermost and outermost parts of the blade may be pitchable, i.e. have a controllable angle of attack with respect to the apparent wind direction. According to an embodiment with a wind turbine with two blades, the innermost part of the two blades may be formed as a single section, so that a total of three blade sections are used to form the two blades.

According to another embodiment, at least the first leeward supporting means is provided with a swivel joint, such as a ball joint, or where at least part of the first leeward supporting means is flexible, e.g. by inclusion of a flexible member. By using a swivel joint, e.g. a ball joint, or by making at least part of the supporting means flexible, it is possible to support a blade that is pitchable as a whole. Also, a supporting means that is at least partly flexible may be advantageous to dampen forces introduced by, e.g., sudden gusts of wind, etc. Of course, it is understood that other supporting means, such as any windward supporting means, or any other supporting means besides the first may also be provided with a swivel joint, or be made flexible at least in part. Naturally, the supporting means may comprise both a swivel joint and a flexible part.

In an alternative embodiment, the nacelle comprises a load-bearing cylinder. Particularly, the nacelle is constructed as a load-bearing cylinder that contains the main shaft, and wherein a generator is mounted on the leeward end of the cylindrical nacelle, on the leeward side of the tower.

According to another embodiment of the invention, the second leeward mounting point is located on a ring that is rotatably mounted around the nacelle, the ring preferably being arranged substantially coaxially with the main shaft. Preferably, the ring is mounted on a bearing that allows the ring to rotate freely around, and in a radial distance from, the main shaft axis.

In another embodiment according to the invention, the extension sleeve mounted on the hub is rotatably mounted on the nacelle by a bearing. In this manner, the load bearing cylindrical nacelle and the preferably cylindrical extension sleeve together form the main bearing that supports the load from the rotor. Therefore, the main shaft does not need to be supported at the windward end of the nacelle.

In one embodiment, the extension sleeve acts as the main shaft, and electric power generation occurs in a generator assembly comprising multi-poled, permanent magnets mounted on the extension sleeve and a corresponding inductive circuit mounted on the nacelle.

The object of the invention is also achieved by a method of supporting blades of an upwind wind turbine. According to this method each blade is provided with at least a first leeward supporting means on a leeward side of the rotor plane, the first leeward supporting means having a first end and a second end, the first end being connected to the blade at a first leeward mounting point positioned in a radial distance from the horizontal axis, and the second end being connected to a second leeward mounting point at a rotatable part of the wind turbine, the second leeward mounting point being positioned in an axial distance from the rotor plane on a leeward side of the rotor. This method enables retrofitting leeward supporting means on blades of wind turbines already erected in the field, wherein the first leeward mounting point on the blade is positioned in a radial distance of 20-100% of the full length of the blade from the hub.

BRIEF DESCRIPTION OF THE DRAWINGS

The invention is explained in detail below with reference to an embodiment shown in the drawings, in which FIG. 5 is a schematic partially cut view of a fourth embodiment of a wind turbine according to the invention, FIG. 6 is a schematic partially cut view of a fifth embodiment of a wind turbine according to the invention.

BEST MODE FOR CARRYING OUT THE INVENTION

Figure 1:
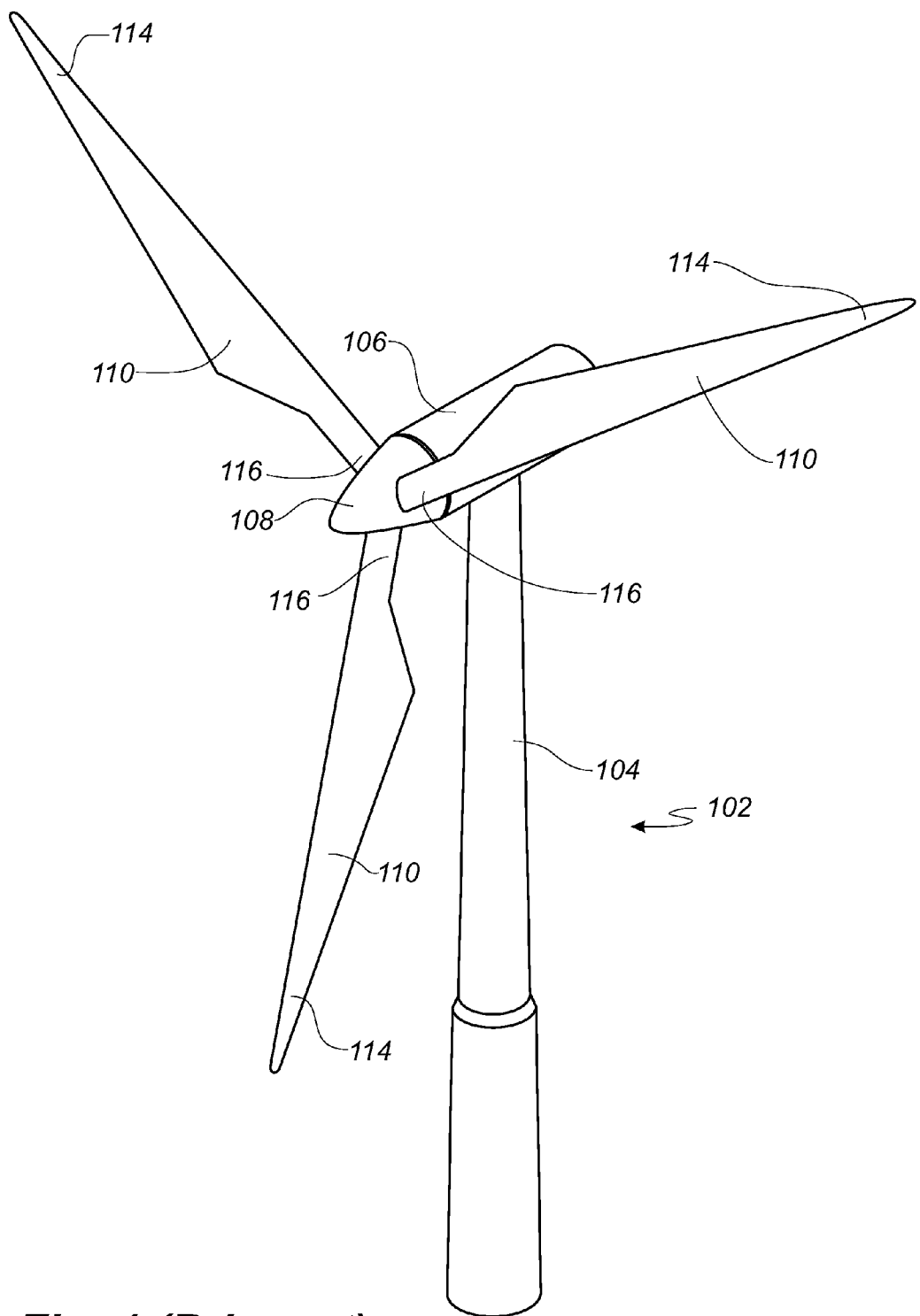
FIG. 1 illustrates a conventional modern upwind wind turbine according to the prior art.

The wind turbine 102 illustrated in FIG. 1 is a modern conventional turbine that comprises a tower 104 supporting a nacelle 106 (also called the windmill housing). A substantially horizontal main shaft projects from the nacelle 106, a rotor being mounted on said shaft, said rotor comprising a hub 108 and two or more blades 110. The rotor can be made to rotate by the wind. Preferably, the wind turbine 102 is a so-called upwind turbine, where the wind impinges on the rotor before it impinges on the tower 104, and where the nacelle 106 is able to yaw, i.e. rotate around a vertical axis with respect to the tower 104, the rotor thereby adjusting itself to the wind direction at any given moment. Moreover, the wind turbine is preferably provided with three blades 110 extending substantially radially outwards from the hub 108 and being formed as so-called shell bodies made of a polymer material reinforced with glass fibres, carbon fibres, or other reinforcement fibres. Each blade 110 comprises a root section 116 near the hub 108 and a blade tip 114.

Figure 2:
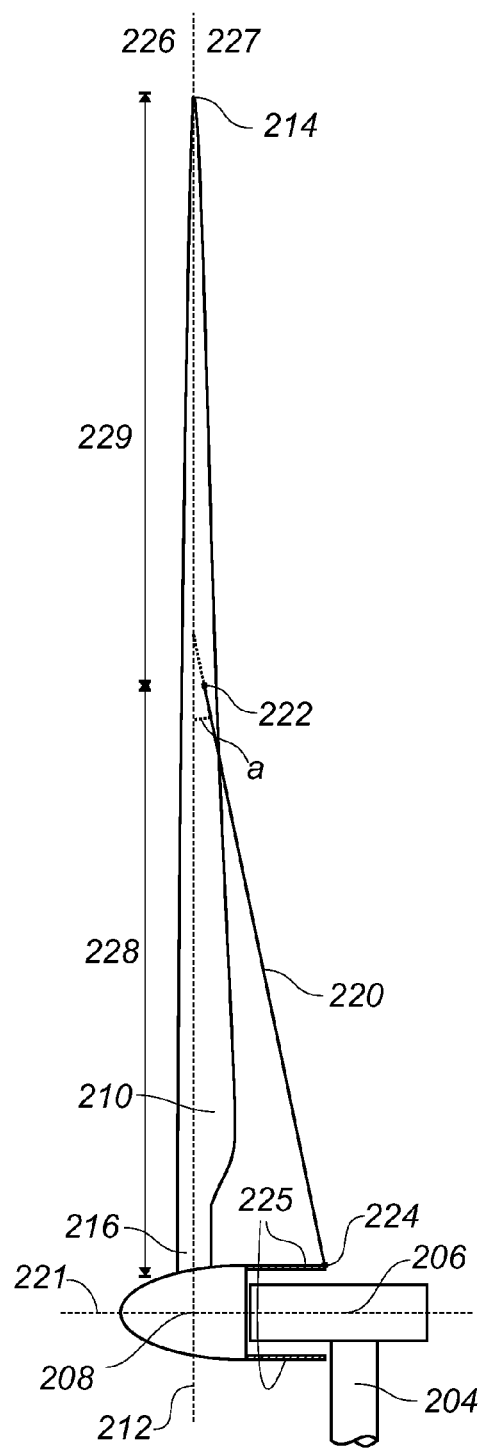
FIG. 2 is a schematic partially cut view of a wind turbine of a first embodiment according to the invention.

The wind turbine shown in FIG. 2 corresponds to the wind turbine shown in FIG. 1 where like reference numerals refer to like parts. Therefore, only the differences are described here. The characteristic feature of the wind turbine shown in FIG. 2 is that the blades 210, featuring innermost parts 228 and outermost parts 229, are supported on leeward sides 227 by leeward supporting means 220 connected between first leeward mounting points 222 located on the blades 210 with second leeward mounting points 224 located in an axial distance from the rotor plane 212. Note that only one blade 210 is shown in the figure, while the others are omitted for clarity. The second leeward mounting point 224 is located on an extension sleeve 225 that is mounted on the hub 208. The extension sleeve 225 may rotate around a horizontal axis 221, exterior to the nacelle 206. The nacelle 206 is rotatably mounted on the tower 204.

Figure 3:
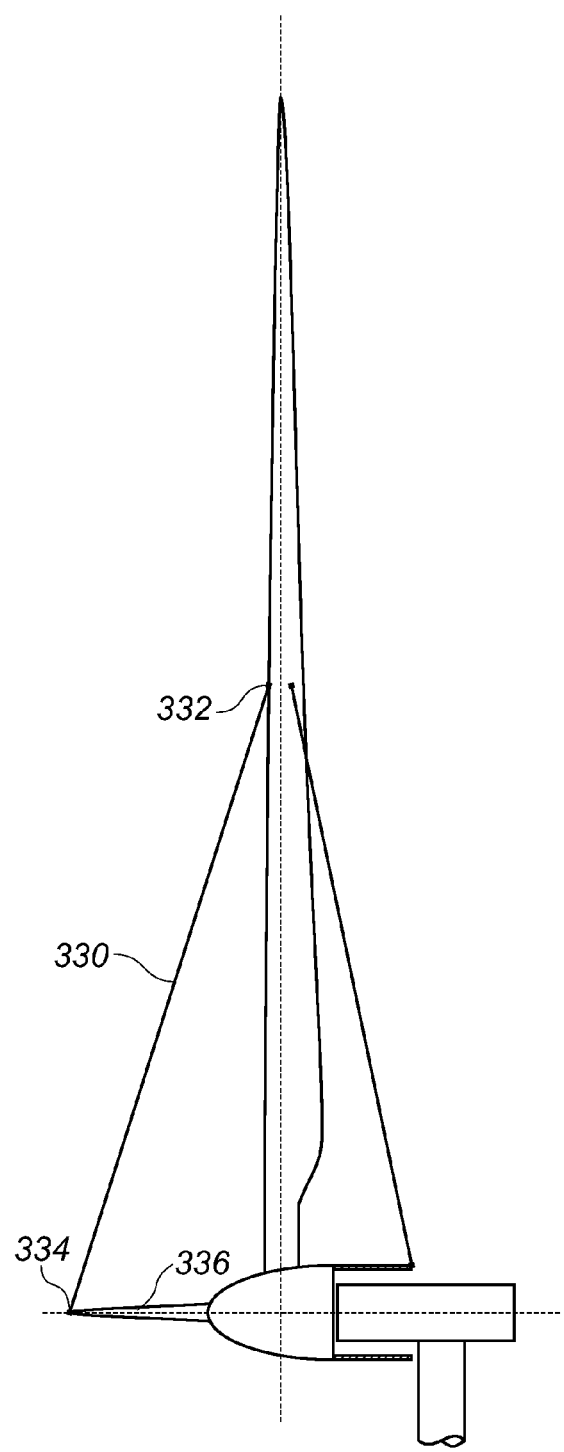
FIG. 3 is a schematic partially cut view of a second embodiment of a wind turbine according to the invention.

FIG. 3 shows a second embodiment that corresponds to the wind turbine shown in FIG. 2. Therefore, only the differences are described here. In this embodiment, the blades are supported on the leeward side as well as on the windward side by a first windward supporting means 330 that is connected to the blade in a first windward mounting point 332 and to a second windward mounting point 334 on a shaft extension 336. The shaft extension 336 extends on the windward side of the hub to which it is preferably connected.

Figure 4:
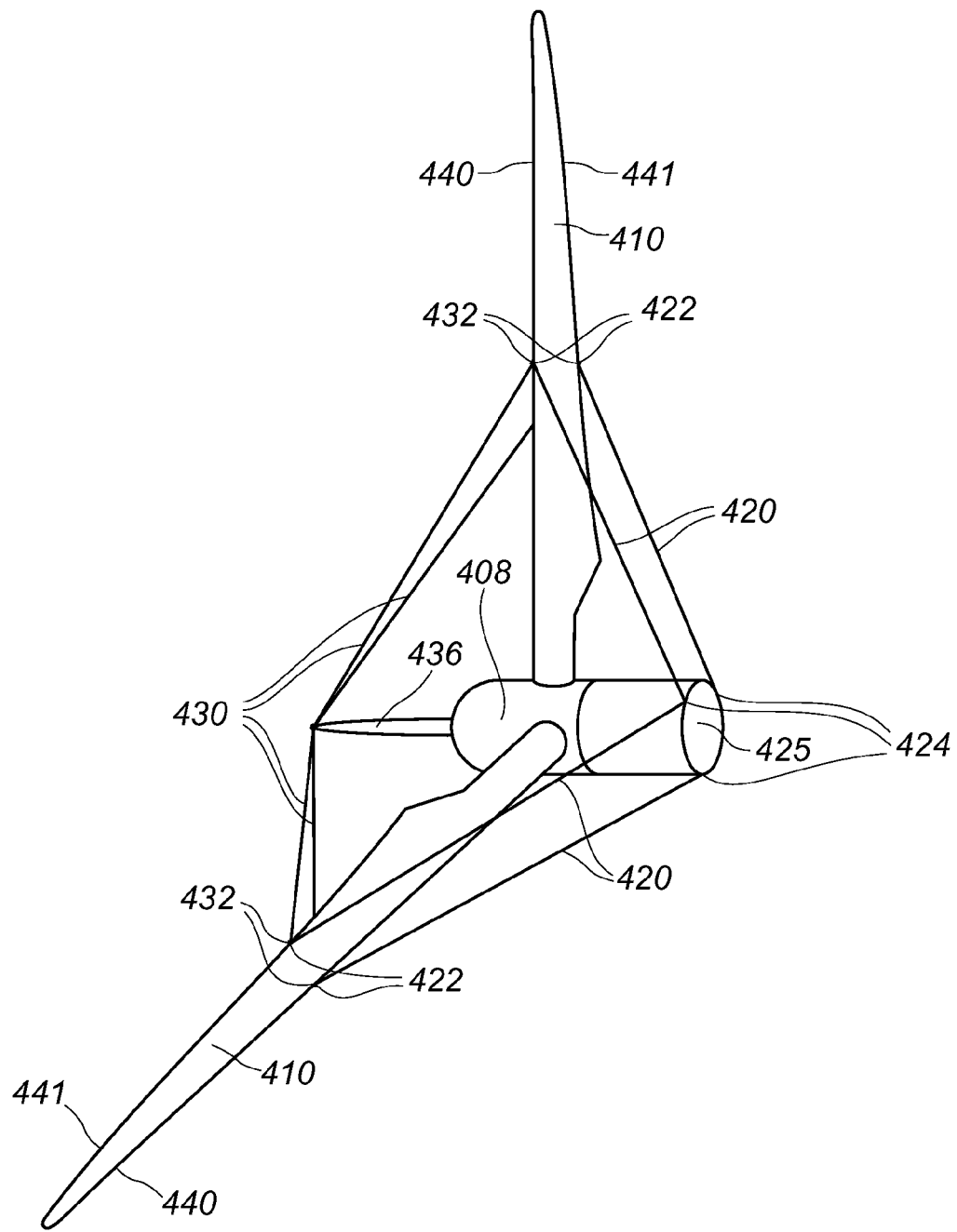
FIG. 4 shows a rotor assembly of a third embodiment of a wind turbine according to the invention.

FIG. 4 shows the rotor assembly of a third embodiment of the invention. The wind turbine rotor assembly shown in FIG. 4 corresponds to the wind turbines in FIG. 2 and FIG. 3, where like reference numerals refers to like parts. Therefore, only the differences are described here. According to this embodiment, the blades 410 of the wind turbine are supported on both the leeward and windward sides. Note that only two of the blades 410 are shown to simplify the figure. The characteristic feature of this embodiment is that each blade 410 is provided with a first leeward supporting means 420 having its first leeward mounting point 422 on or in proximity to a leading edge 440 of the blade 410, and an additional first leeward supporting means 420 having its first leeward mounting point 422 on or in proximity to a trailing edge 441 of the blade 410. The two first leeward mounting points 422 preferably have substantially the same radial distance from the hub. The two second leeward mounting points 424 of the two first leeward supporting means 420 are arranged in an axial distance from the rotor plane, e.g. on an extension sleeve 425 mounted to the hub 408. Furthermore, the blade may be provided with a set of first windward supporting means 430, having first windward mounting points 432 on or in proximity to, respectively, the leading 440 and trailing edge 441 of the blade. By using a set of two leeward supporting means 420, connected to both the leading 440 and trailing edge 441 of the blade, the load on the supporting means 420 is substantially halved, and the load from the first leeward mounting points 422 are displaced over a larger area of the blade, which leads to a stronger connection. Likewise, providing the blade with a set of two windward supporting means 430 substantially halves the load on the windward supporting means 430 and displaces the load applied in the first windward mounting points 432 over a larger area of the blade. The blade may of course be provided with multiple sets of leeward supporting means, distributed along the length of the blade. It is also apparent to a person skilled in the art to, e.g. provide the blade with a set of two windward supporting means 430 and a single supporting means 420 on the leeward side to account for uneven loads on the two sides of the rotor plane. The first leeward mounting point 422 and the additional first leeward mounting point 422, and likewise for the first windward mounting points 432, may also be provided at different radial distances from the hub 408.

FIG. 5 shows a fourth embodiment of the invention, which corresponds to the wind turbine shown in FIG. 2 where like reference numerals refer to like parts. Therefore, only the differences between the two embodiments are described here. In this embodiment the supporting means 520 is arranged to intersect a spacing means 550 that protrudes substantially normally to the rotor plane on the leeward side of the blade. Addition of a spacing means increases the angle a, which results in a smaller force needed along the supporting means 520 to achieve the same force in the horizontal direction, when compared to the situation without a spacing means. This follows from the relation $F=P \sin(a)$, where F is the force along the supporting means 520 and P is the force in the horizontal direction. To reduce drag and noise emissions, it may be advantageous to provide the spacing means 550 with a drag reducing profile (a "drop" profile). The spacing means must be dimensioned to withstand substantial compressible forces of the order of magnitude P. From this, it is evident that the blade may need to be reinforced in the area from where the supporting means extends. Naturally, the blade may be provided with multiple spacing means, to support the length of the innermost part of the blade.

FIG. 6 displays a fifth embodiment of the invention, and is described here with reference to the differences as compared to FIG. 2, where like reference numerals refer to like parts. According to this embodiment, the blade is divided in two parts, namely the innermost part 628 and the outermost part 629. Both parts are individually pitchable, i.e. may be rotated around their longitudinal axis. The first leeward mounting point may be located towards the outer end of the innermost part 628 of the blade, or on an intermediate part that separates the innermost part 628 and the outermost part 629, or even in proximity to the inner end of the outermost part 629. Alternatively, only one of the blade parts is pitchable.

Figure 7A:
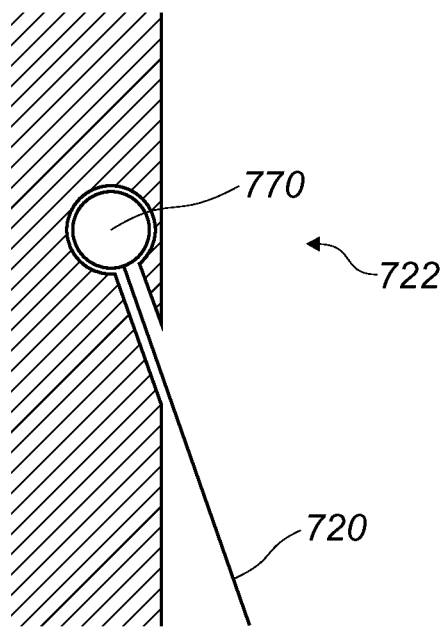
FIGS. 7a and 7b shows two different embodiments of the connection between the blade and the supporting means.
Figure 7B:
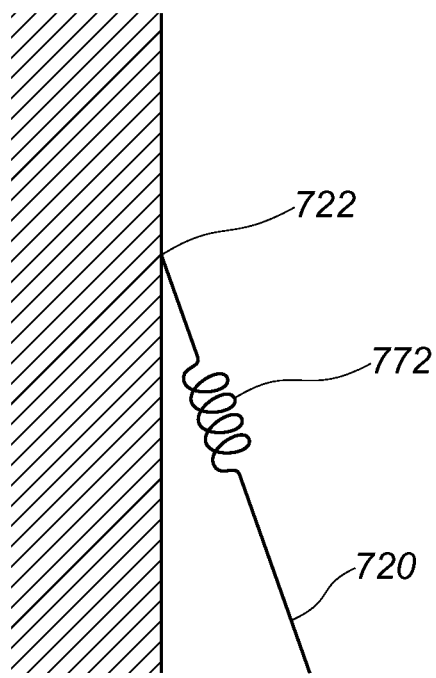

FIGS. 7a and 7b shows two embodiments of the first leeward mounting point 722, i.e. the mounting point of the supporting means to the blade. Since the blade part on which the first leeward mounting point 722 is located may be pitchable, the relative direction of the supporting means 720 to the blade surface, or even the distance from the first leeward mounting point to the second leeward mounting point may differ. Therefore, care must be taken to allow the blade freedom to pitch, while being supported by the supporting means. According to the embodiment in FIG. 7a, this problem is remedied by providing the supporting means with a ball joint, thereby allowing blade to turn with regard to the supporting means 720. An alternative solution is shown in FIG. 7b, where the otherwise rigid supporting means 720 is provided with a flexible member 772, e.g. a spring, to account for changes in the distance between the mounting points at the two ends of the supporting means. It is apparent for a person skilled in the art that the blade may need to be reinforced in the area, where the first leeward mounting point 722 is provided in order to withstand the forces imposed by the supporting means 720. It is also apparent that the two solutions shown in FIGS. 7a and 7b may be combined.

Figures 8, 9:
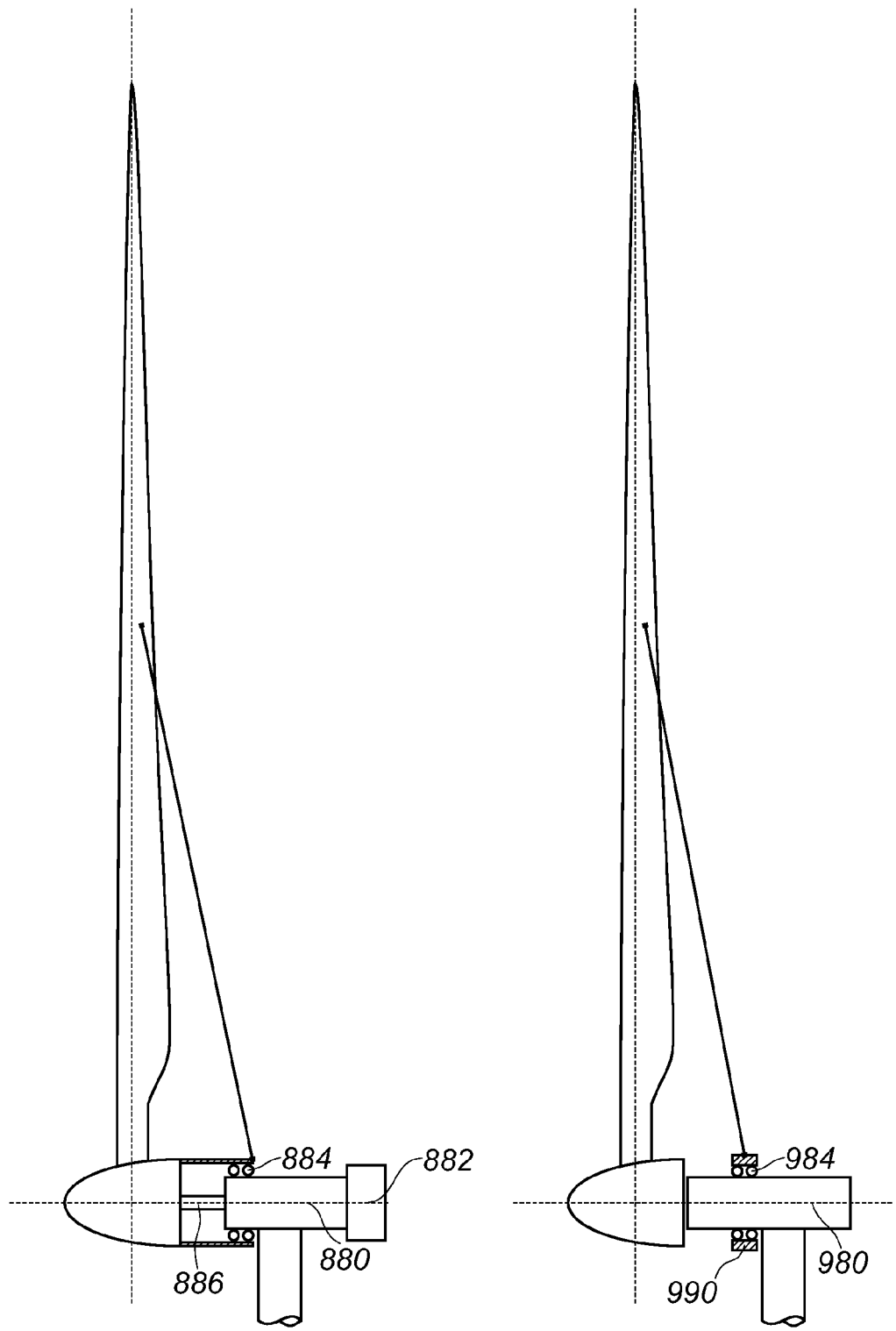
FIG. 8 is a schematic partially cut view of a sixth embodiment of a wind turbine according to the invention.
FIG. 9 is a schematic partially cut view of a seventh embodiment of a wind turbine according to the invention.

FIG. 8 displays a sixth embodiment of the invention, which corresponds to the wind turbine shown in FIG. 2. Therefore only the differences between the two embodiments are described here. In this embodiment, a nacelle 880 is provided as a load bearing cylinder that supports a generator 882 in one end, and the rotor in the other end. The rotor is connected to the generator 882 by a main shaft 886. The main bearing that supports the rotor is provided as a bearing 884 between the outside of the load bearing cylinder 880 that forms the nacelle and an extension sleeve.

FIG. 9 shows a seventh embodiment of the invention, which corresponds to the wind turbine shown in FIG. 2. Therefore, only the differences between the two embodiments are described here. According to this embodiment, the second leeward mounting points of the supporting means are mounted on a rotatable ring 990 that may rotate freely around the nacelle, which is provided as a load bearing cylinder 980. The rotatable ring 990 is mounted to the nacelle by a bearing 984.

Figure 10:
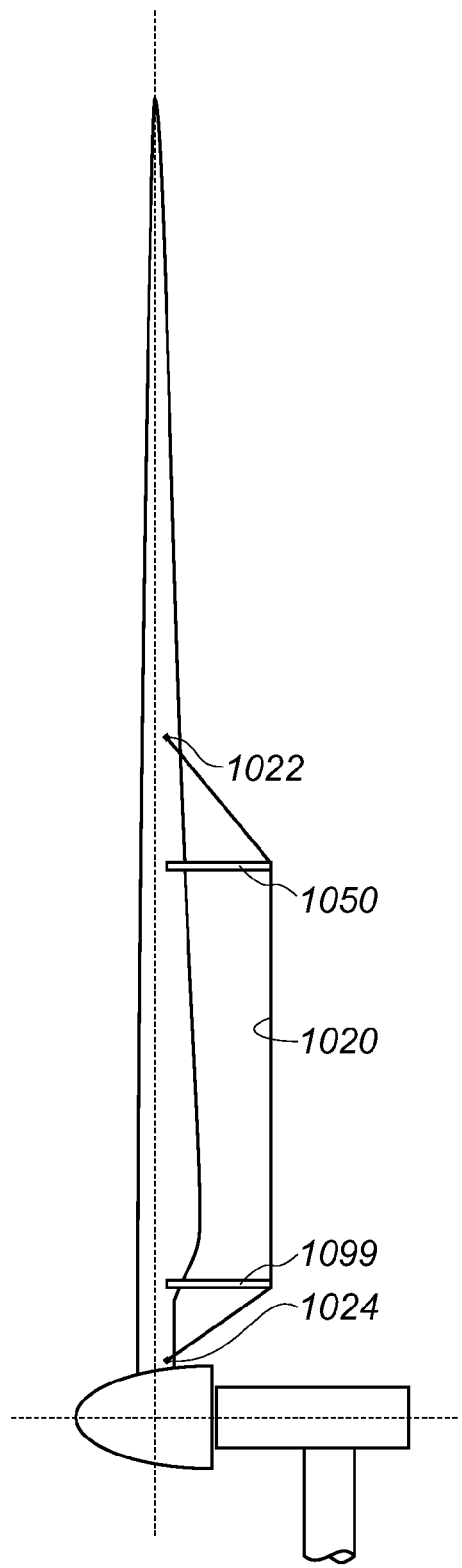
FIG. 10 is a schematic partially cut view of an eighth embodiment of a wind turbine according to the invention.

FIG. 10 shows an eighth embodiment of the invention, which corresponds to the wind turbine shown in FIG. 2. Therefore, only the differences between the two embodiments are described here. According to this embodiment, the second leeward mounting point 1024 of the first leeward supporting means 1020 is located on the blade in proximity to the blade root. Furthermore, the blade comprises one spacing means 1050, or as shown in the figure a spacing means 1050 and a second spacing means 1099. It is evident that the blade may comprise a higher number of spacing means, such as three, four, five or six. In a configuration according to this embodiment, one may consider it as if the second leeward mounting point is located on the second spacing means 1099, which is then supported in the radial direction with an additional supporting means extending towards the blade root.

The examples have been described according to preferred embodiments. However, the invention is not limited to these embodiments. For example the blade may be provided with multiple supporting means.

REFERENCE LIST a angle
102 wind turbine
104, 204 tower
106, 206 nacelle
108, 208, 408 hub
110, 210, 410 blade
114, 214 blade tip
116, 216 blade root
212 rotor plane
220, 420, 520, 720, 1020 supporting means
221 horizontal axis
222, 422, 522, 722, 1022 first leeward mounting point
224, 424, 524, 1024 second leeward mounting point
225, 425 extension sleeve
226 windward side
227 leeward side
228, 628 innermost part
229, 629 outermost part
330, 430 windward supporting means
332, 432 first windward mounting point
334, 434 second windward mounting point
336, 436 shaft extension
440 leading edge
441 trailing edge
550, 1050 spacing means
770 ball joint
772 flexible member
880, 980 load bearing cylinder
882 generator
884, 984 bearing
886 main shaft
990 rotatable ring
1099 second spacing means

The invention claimed is:

1. A wind turbine (102) comprising a number of blades (110, 210, 410) extending substantially radially from a rigid hub (108, 208, 408) on a main shaft (886) having a substantially horizontal axis (221), the blades (110, 210, 410) together with the hub (108, 208, 408) constituting a rotor with a rotor plane (212), and which can be put into rotation by wind, wherein the main shaft (886) is pivotally mounted in a nacelle (106, 206) mounted on top of a tower (104, 204), the nacelle (106, 206) being able to pivot around a vertical axis in relation to the tower (104, 204), hereby being able to adjust the rotor plane of the blades (110, 210, 410) in relation to a direction of the wind, and wherein the wind turbine is an upwind machine in that the rotor during normal use of the wind turbine (102) is positioned on the upwind side of the tower (104, 204), the rotor during normal use of the wind turbine (102) having a windward side (226) and a leeward side (227), and each blade having an innermost part (228, 628) comprising a root section of the blade and an outermost part (229, 629) comprising a tip section of the blade, characterized in that each blade (110, 210, 410) is supported on the leeward side (227) so as to support the blade against forces in the upwind direction by at least a first leeward supporting means (220, 420, 520, 720, 1020) having a first end and a second end, the first end being connected to the blade at a first leeward mounting point (222, 422, 522, 722, 1022) positioned in a radial distance from the horizontal axis (221), and the second end being connected to a second leeward mounting point (224, 424, 524, 1024) at a rotatable part of the wind turbine (102), the second leeward mounting point being positioned in an axial distance from the rotor plane (212) on the leeward side (227) of the rotor, wherein the first leeward mounting point (222, 422, 522, 722, 1022) on the blade (110, 210, 410) is positioned in a radial distance of 20-100% of the full length of the blade (110, 210, 410) from the hub (108, 208, 408), wherein the blade is provided with at least a first spacing means (550, 1050) that protrudes substantially normally to the rotor plane (212) on the leeward side of the rotor, and where the spacing means intersects the first leeward supporting means (220, 420, 520, 720, 1020).

2. A wind turbine (102) according to claim 1, wherein each blade (110, 210, 410) is supported on the windward side by at least a first windward supporting means (330, 430) having a first end and a second end, the first end being connected to the blade at a first windward mounting point (332, 432) positioned in a radial distance from the hub (108, 208, 408), and the second end being connected to a second windward mounting point (334, 434) at a rotatable part of the wind turbine (102), the second windward mounting point (334, 434) being positioned in an axial distance from the rotor plane (212) on the windward side (226) of the rotor.

3. A wind turbine (102) according to claim 1, wherein the blades (110, 210, 410) are fiber-reinforced polymer shell bodies.

4. A wind turbine (102) according to claim 1, wherein the first leeward supporting means (330, 430) and/or a first windward supporting means (220, 420, 520, 720, 1020) are chosen from the group of stays, stiffeners, guys, wires, or struts.

5. A wind turbine (102) according to claim 1, wherein the first leeward mounting point (222, 422, 522, 722, 1022) on the blade (110, 210, 410) is positioned in a radial distance of 25-70% of the full length of the blade (110, 210, 410) from the hub (108, 208, 408), or alternatively between 30%-60%.

6. A wind turbine (102) according to claim 1, wherein the blade is provided with the first leeward mounting point (222, 422, 522, 722, 1022) in proximity to the leading edge (440) of the blade (110, 210, 410), and an additional first leeward mounting point (222, 422, 522, 722, 1022) in proximity to the trailing edge (441) of the blade (110, 210, 410), the two first leeward mounting points (222, 422, 522, 722, 1022) having substantially the same radial distance from the hub (108, 208, 408).

7. A wind turbine (102) according to claim 1, wherein the second leeward mounting point (224, 424, 524) is located on an extension sleeve (225, 425) that is connectively mounted to the hub (108, 208, 408) on the leeward side of the rotor, so that the extension sleeve (225, 425) surrounds the main shaft (886) in a radial distance.

8. A wind turbine (102) according to the claim 7, wherein the extension sleeve (225, 425) mounted on the hub (108, 208, 408) is rotatably mounted on the nacelle (106, 206) by a bearing (884, 984).

9. A wind turbine (102) according to claim 1, wherein each blade (110, 210, 410) has a total length of at least 40 meters.

10. A wind turbine (102) according to claim 1, wherein the innermost (228, 628) and outermost part (229, 629) of the blade (110, 210, 410) are constructed as two individual parts, where one or both parts may be pitched around a longitudinal axis of the blade (110, 210, 410), oriented in the substantially radial direction.

11. A wind turbine (102) according to claim 1, wherein at least the first leeward supporting means (220, 420, 520, 720, 1020) is provided with a swivel joint, the swivel joint being a ball joint (772), or where at least part of the first leeward supporting means (220, 420, 520, 720, 1020) is flexible.

12. A wind turbine (102) according to claim 1, wherein the nacelle comprises a load bearing cylinder (880, 980).

13. A wind turbine (102) according to claim 1, wherein the second leeward mounting point (224, 424, 524, 1024) is located on a ring (990) that is rotatably mounted around the nacelle (106, 206), the ring being arranged substantially coaxially with the main shaft (886).

14. A method of supporting blades (110, 210, 410) of an upwind wind turbine (102) comprising a two or three blades (110, 210, 410), the blades being made of fiber-reinforced polymer shell bodies, each blade having a length of at least 40 meters, the blades extending substantially radially from a rigid hub (108, 208, 408), the blades (110, 210, 410) together with the hub (108, 208, 408) constituting a rotor with a rotor plane (212), characterized by providing each blade (110, 210, 410) with at least a first leeward supporting means (220, 420, 520, 720, 1020) on a leeward side (227) of the rotor plane (212), the first leeward supporting means (220, 420, 520, 720, 1020) having a first end and a second end, the first end being connected to the blade (110, 210, 410) at a first leeward mounting point (222, 422, 522, 722, 1022) positioned in a radial distance from a horizontal axis (221), and the second end being connected to a second leeward mounting point (224, 424, 524, 1024) at a rotatable part of the wind turbine (102), the second leeward mounting point (224, 424, 524, 1024) being positioned in an axial distance from the rotor plane (212) on a leeward side (227) of the rotor, wherein the first leeward mounting point (222, 422, 522, 722, 1022) on the blade (110, 210, 410) is positioned in a radial distance of 20-100% of the full length of the blade (110, 210, 410) from the hub (108, 208, 408) wherein the blade is provided with at least a first spacing means (550, 1050) that protrudes substantially normally to the rotor plane (212) on the leeward side of the rotor, and where the spacing means intersects the first leeward supporting means (220, 420, 520, 720, 1020).

* * * * *